(12) United States Patent
Ratnam et al.

(10) Patent No.: US 8,719,207 B2
(45) Date of Patent: May 6, 2014

(54) METHOD AND SYSTEM FOR PROVIDING DECISION MAKING BASED ON SENSE AND RESPOND

(75) Inventors: Gopal Ratnam, Redwood City, CA (US); Keshava Rangarajan, Foster City, CA (US); Sudeep Agarwal, San Francisco, CA (US); Athanasios Bismpigiannis, Sunnyvale, CA (US); Nagaraj Srinivasan, Union City, CA (US); Ramchand Raman, Redwood City, CA (US); Lalit Agrawal, Fremont, CA (US); Alosh Bennet, Andhra Pradesh (IN); Chandra Yeleshwarapu, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 567 days.

(21) Appl. No.: 12/844,632

(22) Filed: Jul. 27, 2010

(65) Prior Publication Data

US 2012/0030160 A1 Feb. 2, 2012

(51) Int. Cl.
G06F 17/00 (2006.01)
(52) U.S. Cl.
USPC ............................................. 706/47; 705/7.12
(58) Field of Classification Search
None
See application file for complete search history.

(56) References Cited

U.S. PATENT DOCUMENTS

| | | | | |
|---|---|---|---|---|
| 5,787,283 A | * | 7/1998 | Chin et al. | 717/101 |
| 6,892,192 B1 | * | 5/2005 | Geddes et al. | 706/14 |
| 7,613,695 B1 | | 11/2009 | Solomon et al. | |
| 7,761,319 B2 | * | 7/2010 | Gil et al. | 705/7.12 |
| 7,774,363 B2 | * | 8/2010 | Lim | 707/781 |
| 7,969,306 B2 | * | 6/2011 | Ebert et al. | 340/572.1 |
| 8,180,760 B1 | | 5/2012 | Carver et al. | |
| 8,527,545 B2 | * | 9/2013 | Bobick et al. | 707/793 |
| 2002/0059201 A1 | | 5/2002 | Work | |
| 2003/0109951 A1 | * | 6/2003 | Hsiung et al. | 700/108 |
| 2003/0229550 A1 | * | 12/2003 | DiPrima et al. | 705/28 |
| 2006/0190490 A1 | | 8/2006 | Ritchey et al. | |
| 2007/0070409 A1 | | 3/2007 | Nakagawa et al. | |
| 2007/0073719 A1 | | 3/2007 | Ramer et al. | |
| 2007/0260627 A1 | | 11/2007 | Knittel et al. | |
| 2008/0005076 A1 | | 1/2008 | Payne et al. | |
| 2008/0059474 A1 | * | 3/2008 | Lim | 707/9 |

(Continued)

OTHER PUBLICATIONS

Chang Xu; Cheung, S.C.; Chan, W.K.; Chunyang Ye, "Heuristics-Based Strategies for Resolving Context Inconsistencies in Pervasive Computing Applications," Distributed Computing Systems, 2008. ICDCS '08. The 28th International Conference on , vol., No., pp. 713,721, Jun. 17-20, 2008.*

(Continued)

Primary Examiner — Jeffrey A Gaffin
Assistant Examiner — David H Kim
(74) Attorney, Agent, or Firm — Kilpatrick Townsend & Stockton LLP

(57) ABSTRACT

According to an embodiment, the present invention provides a method for providing automated decision in response to one or more responses. The method includes providing, at a computer system, a user interface for receiving input from a user. The method also includes detecting a first event. The method further includes receiving a first set of attributes associated with the first event. Also, the method includes processing the first set of attributes. The method additionally includes analyzing the first set of attributes using at least pattern recognition. The method includes determining a first context for the first event based at least on the first set of attributes.

12 Claims, 9 Drawing Sheets

(56) References Cited

U.S. PATENT DOCUMENTS

| | | | |
|---|---|---|---|
| 2008/0071595 A1* | 3/2008 | Chang et al. | 705/7 |
| 2008/0097748 A1* | 4/2008 | Haley et al. | 704/9 |
| 2008/0209078 A1* | 8/2008 | Bates et al. | 710/10 |
| 2008/0212899 A1 | 9/2008 | Gokturk et al. | |
| 2008/0294607 A1 | 11/2008 | Partovi et al. | |
| 2009/0132448 A1* | 5/2009 | Eder | 706/13 |
| 2009/0132500 A1 | 5/2009 | Jones et al. | |
| 2009/0187883 A1* | 7/2009 | Kuester et al. | 717/105 |
| 2009/0192987 A1 | 7/2009 | Loeser et al. | |
| 2009/0222444 A1 | 9/2009 | Chowdhury et al. | |
| 2009/0319342 A1 | 12/2009 | Shilman et al. | |
| 2010/0049590 A1 | 2/2010 | Anshul | |
| 2010/0088629 A1 | 4/2010 | Xu et al. | |
| 2010/0145815 A1 | 6/2010 | Weng | |
| 2010/0185630 A1 | 7/2010 | Cheng et al. | |
| 2010/0198820 A1 | 8/2010 | Work | |
| 2010/0262550 A1 | 10/2010 | Burritt et al. | |
| 2010/0293169 A1 | 11/2010 | Takata et al. | |
| 2010/0306119 A1 | 12/2010 | Banerjee et al. | |
| 2011/0047246 A1 | 2/2011 | Frissora et al. | |
| 2011/0055186 A1 | 3/2011 | Gopalakrishnan | |
| 2011/0082848 A1 | 4/2011 | Goldentouch | |
| 2011/0087626 A1 | 4/2011 | Yeleshwarapu et al. | |
| 2011/0161253 A1 | 6/2011 | Ma et al. | |
| 2011/0191417 A1 | 8/2011 | Rathod | |
| 2011/0209193 A1 | 8/2011 | Kennedy | |
| 2011/0209195 A1 | 8/2011 | Kennedy | |
| 2011/0209196 A1 | 8/2011 | Kennedy | |
| 2011/0231407 A1 | 9/2011 | Gupta et al. | |
| 2011/0252121 A1 | 10/2011 | Borgs et al. | |
| 2011/0252463 A1 | 10/2011 | Yeleshwarapu et al. | |
| 2011/0302102 A1 | 12/2011 | Yeleshwarapu et al. | |
| 2011/0307478 A1 | 12/2011 | Pinckney et al. | |
| 2012/0166247 A1* | 6/2012 | Tu et al. | 705/7.27 |
| 2012/0323617 A1* | 12/2012 | Papst | 705/7.11 |

OTHER PUBLICATIONS

Heng Lu, W.K. Chan, and T.H. Tse. 2008. Testing pervasive software in the presence of context inconsistency resolution services. In Proceedings of the 30th international conference on Software engineering (ICSE '08). ACM, New York, NY, USA, 61-70.*

U.S. Appl. No. 12/757,763, filed Apr. 9, 2010, Final Office Action mailed Aug. 22, 2012, 30 pages.

Butner, Karen et al., "Sense-and-respond supply chains: enabling breakthrough strategy," IBM Global Business Services, Aug. 2004, 16 pages.

Ferrari, Bob, "Analyst: Sense and Respond goes Beyond RFID," RFID Update, May 24, 2006, 2 pages.

Gunasekaran, A. et al., "Information systems in supply chain integration and management," European Journal of Operational Research, 2003, pp. 269-295.

Kumar, Sandeep et al., "Creating Supply Chain Flexibility in the Flattening World," SETLabs Briefings, vol. 5, No. 3, Jul.-Sep. 2007, pp. 1-13.

Polymita Technologies, "Business Activity Monitoring," http://www.polymita.com/portal/bpm/bam, downloaded Jun. 19, 2009, 3 pages.

SAP Solution Brief, "Supply Chain Execution Sense and Respond with an Adaptive Supply Chain Network," 2005, 4 pages.

Schiefer, Josef et al., "Management and Controlling of Time-Sensitive Business Processes with Sense & Respond," Proceedings of the 2005 International Conference on Computational Intelligence for Modeling, Control and Automation, downloaded Jun. 18, 2009, 6 pages.

Supply Chain Management, http://www.eil.utoronto.ca/profiles/rune/node5.html, downloaded Jun. 19, 2009, 13 pages.

U.S. Appl. No. 12/757,763, filed Apr. 9, 2010, 42 pages.

U.S. Appl. No. 12/767,286, filed Apr. 26, 2010, 36 pages.

U.S. Appl. No. 12/793,375, filed Jun. 3, 2010, 27 pages.

U.S. Appl. No. 12/757,763, filed Apr. 9, 2010, Office Action mailed Mar. 16, 2012, 33 pages.

U.S. Appl. No. 12/767,286, filed Apr. 26. 2010, Office Action mailed Mar. 15, 2012, 16 pages.

U.S. Appl. No. 12/793,375, filed Jun. 3, 2010, mailed May 29, 2012, 6 pages.

U.S. Appl. No. 12/757,763, filed Apr. 9, 2010, Office Action mailed Apr. 23, 2013, 51 pages.

U.S. Appl. No. 12/767,286, filed Apr. 26, 2010, Final Office Action mailed Sep. 26, 2012, 19 pages.

U.S. Appl. No. 12/767,286, filed Apr. 26, 2010, Non-final Office Action mailed Apr. 25, 2013, 38 pages.

U.S. Appl. No. 12/793,375, filed Jun. 3, 2010, Final Office Action mailed Dec. 7, 2012, 23 pages.

U.S. Appl. No. 12/793,375, filed Jun. 3, 2010 Advisory Action mailed Mar. 8, 2013, 4 pages.

* cited by examiner

METHOD AND SYSTEM FOR PROVIDING DECISION MAKING BASED ON SENSE AND RESPOND

CROSS-REFERENCES TO RELATED APPLICATIONS

This application relates to U.S. patent application Ser. No. 12/757,763, entitled METHOD AND SYSTEM FOR PROVIDING ENTERPRISE PROCUREMENT NETWORK, filed on Apr. 9, 2010, U.S. patent application Ser. No. 12/767,286, entitled PRODUCT CLASSIFICATION IN PROCUREMENT SYSTEMS, filed on Apr. 26, 2010, U.S. patent application Ser. No. 12/793,37, entitled COMMUNITY RATING IN ENTERPRISE APPLICATIONS, filed on Jun. 3, 2010, which are incorporated by reference in their entirety for any and all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present invention is directed to method and system for providing decision making based on sense and respond. More specifically, various embodiments of the present invention provide techniques for detecting, processing and analyzing one or more events based on a given set up of rules, and based on the analysis of the events, providing suggestions for responding to the one or more events. For example, rules are customized for specific needs and are dynamically updated. In one embodiment, both short-term and long-term responses are provided in response to an event. There are other embodiments as well, as will be described below.

Over the last few decades, with advent of computer technologies, organizations are becoming more and more reliant on automated business intelligence technologies. Business intelligence technologies provide functions such as reporting, online analytical processing, analytics, data mining, business performance management, benchmarking, text mining, and predictive analytics. Using business intelligence techniques, organizations are able to operate more efficiently.

The use of business intelligence is becoming more prevalent. Currently, there are various conventional techniques for providing some types of automated decision making techniques. Unfortunately, conventional techniques are often inadequate.

Therefore, improved techniques for providing decision making based on sense and respond are highly desirable.

BRIEF SUMMARY

Aspects of the present invention includes implementing a sense and respond application. The implementation of the sense and respond application includes a design-time aspect and a run-time aspect. In one embodiment, the design-time aspect includes receiving and processing information from various sources, and defining event sources. Furthermore, design-time includes defining entities, attributes, and types of objects associated with the event sources. Additionally, business solutions, business logic and contexts are defined. Then, responses associated with the context are defined. Accordingly, the events, situations, responses, and business objects are deployed by a sense and respond server.

In a further embodiment, the run-time aspect includes detecting and event and then analyzing, filtering, and routing the event. The event is then normalized and enriched, and then attributes of the event are analyzed to determine a context of the event. The events are correlated and conditions are evaluated. Finally, the response is defined and executed.

Certain embodiments are directed to method and system for providing decision making based on sense and respond. More specifically, various embodiments of the present invention provide techniques for detecting, processing and analyzing one or more events based on a given set up of rules, and based on the analysis of the events, providing suggests for responding to the one or more events. For example, rules are customized for specific needs and are dynamically updated. In one embodiment, both short-term and long-term responses are provided in response to an event. There are other embodiments as well, as will be described below.

According to an embodiment, the present invention provides a method for providing automated decision in response to one or more events, set of event, or responses. The method includes providing, at a computer system, a user interface for receiving input from a user. The method also includes detecting a first event. The method further includes receiving a first set of attributes associated with the first event. Also, the method includes processing the first set of attributes. The method additionally includes analyzing the first set of attributes using at least pattern recognition. The method includes determining a first context for the first event based at least on the first set of attributes. The method additionally includes retrieving a set of related events based on the first contact and the first set of attributes. The method further includes determining dependencies between the first event and the set of related events. The method includes generating a first set of responses based on the first set of attributes and the dependencies using a first set of rules. The method includes providing, at the user interface, the first set of response to the user.

According to another embodiment, the present invention provides a method for providing automated decision in response to one or more responses. The method includes providing, at a computer system, a user interface for receiving input from a user. The method also includes receiving a set of training events, each of the training events being associated with a plurality of attributes. The method further includes receiving a set of training data associated with the first set of training events, the set of training data including a set of sensing information and set of response information. The method additionally includes processing the set of training events and the set of training data. The method also includes determining a set of rules and exceptions based on the set of training events and the set of training data. The method further includes receiving, via the user interface, user inputs. The method includes modifying the set of rules based on the user inputs.

According to yet another embodiment, the present invention provides, the present invention provides a method for providing automated decision in response to one or more responses. The method includes providing, at a computer system, a user interface for receiving input from a user. The method also includes detecting a first event. The method additionally includes receiving a first set of attributes associated with the first event. The method further includes processing the first set of attributes. The method additionally includes determining a first context information for the first event based at least on the first set of attributes. The method also includes storing the first context information. The method also includes analyzing the first context information. The method also includes selecting a logic element for interpreting the first context information. The method also includes checking a context inconsistency using the logic element. The method also includes resolving the context inconsistency if it is determined that the first contact information has the context inconsistency. The method also includes determining dependencies between the first event and the set of related events using at least the first context information. The method includes generating a first set of responses based on the first set of attributes and the dependencies using a first set of rules and the first context information. The method also includes providing, at the user interface, the first set of response to the user.

Various additional objects, features and advantages of the present invention can be more fully appreciated with reference to the detailed description and accompanying drawings that follow.

DETAILED DESCRIPTION

Certain embodiments are directed to method and system for providing decision making based on sense and respond. More specifically, various embodiments of the present invention provide techniques for detecting, processing and analyzing one or more events based on a given set up of rules, and based on the analysis of the events in a context, providing suggests for responding to the one or more events. For example, rules are customized for specific needs and are dynamically updated. In one embodiment, both short-term and long-term responses are provided in response to an event. There are other embodiments as well, as will be described below.

Techniques for providing decision making based on sense and response have a wide range of applications. In a supply chain, changes take place all the time. Depending on the importance of these changes, as well as on how frequently they happen, the operators need to make decisions and plan ahead. These planning decisions may be of an operational, tactical or even strategic level. The operators of the supply chain take such decisions based on information from the existing systems, such as enterprise resource planning (ERP), news feed, feed external ecommerce systems (i.e., Oracle Supplier Network), as well as information on sales, costs and sometimes estimated data. However, this information is not centrally available and the sources of events are multiple, internal as well as external. As a result, the process of decision making is often a difficult and time consuming process, which may not always produce desirable and results. Moreover, due the fact that most of the data may be just estimates of future values, errors in the forecasts are often made by the decision makers.

In the past, in supply chain process operations, decision making processes are not automated. Often, operators make their decisions based on data from the ERP system, news feed, feed from external ecommerce systems (i.e., Oracle Supplier Network), or other information technology systems of the company, or even data from market research. However, since these types of data are in a raw format, processing these data is difficult, time-consuming, and unpredictable. Many times, operators and decision makers use third-party consulting services, which again were based on the same information.

Figure 1:
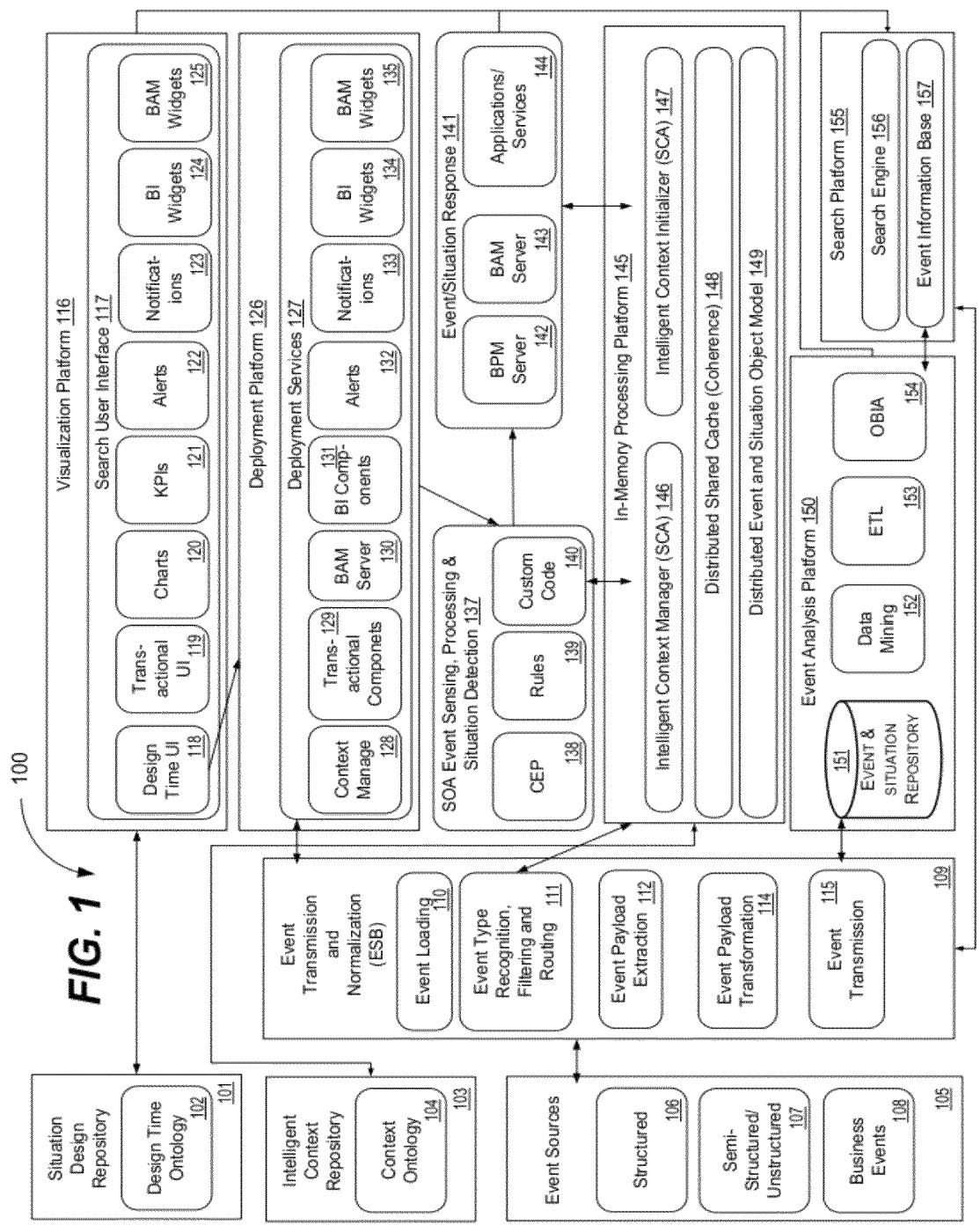
FIG. 1 is simplified diagram illustrating a system for facilitating decision making process, according to an embodiment of the present invention.

As described below, various embodiments of the present invention provide automated decision making process using a sense and respond system. FIG. 1 is simplified diagram illustrating a system for facilitating decision making process according to an embodiment of the present invention. This diagram is merely an example, which should not unduly limit the scope of the claims. One of ordinary skill in the art would recognize many variations, alternatives, and modifications.

Turning now to FIG. 1, which illustrates a simplified diagram of a system 100 for facilitating decision making process, according to an embodiment of the present invention. In one embodiment, system 100 includes situation design repository 101 which This repository contains definition of events, situations, processes, and rules that are used to determine the situations, event sources, sinks, and response actions. The situation design repository 101 includes a design time ontology 102, which is in the situation design knowledge base and contains ontological descriptions and interconnection rules of the various components defined in the situation design repository 101.

System 100 further includes an intelligent context repository 103 which contains definitions of contextual elements needed for determining the processing of the events. The intelligent context repository 103 includes a context ontology 104, which is configured to manage the storage of a context mediator's knowledge. This knowledge includes the ontology for describing various types of contexts as well as ontology instance data.

System 100 further includes event sources 105 which includes sensor events, application events, and/or human input. These events form the input to the system, which the system analyzes, interprets and responds to. Event sources 105 is a generator module for specified events. Among other thing, the event sources 105 could encapsulate a wide variety of real world sources (e.g., Data Base Tables, RSS Feeds, Web Service Calls, etc.). For example, the event sources 105 can be seen as an adapter which pumps the events into the Sense and Respond Framework. An event source can feed many event types. For example, one event can be fed by multiple event sources. A pluggable adapter capable of pumping in events can be referred to as a type of an event source. Event sources 105 may be created in various ways: service-oriented architecture (SOA) composite, plain old java object (POJO), and the like.

Event sources 105 includes multiple types of events: structured 106, semi-structured/unstructured 107, and business events 108. Structured events 106 have a backing relational model that defines the elements and types, and are easy to process. Semi-Structured/Unstructured events 107 is a form of structured data that does not conform with the formal structure of tables and data models associated with databases, but contains nonetheless tags or other markers to separate semantic elements and hierarchies of records and fields within the data. Finally, semi-structured events 108 are increasingly occurring since the advent of the Internet where full-text documents and databases are not the only forms of data. Especially in object-oriented databases you often find semi-structured data. For example, Web APIs (i.e., REST/SOAP) could be used to pull or push data.

System 100 includes an event transmission and normalization (ESB) module 109 which receives raw data from one or more sources 105 and formats the data into a standard event format, which can then be processed by other modules of system 100. The event transmission and normalization (ESB) module 109 includes event loading 110 which loads event data from the event source 105 into the event service bus. Event transmission and normalization (ESB) module 109 also includes an event type recognition, filtering, and routing module 111, which determines the type of event. This can be done by examining the type information in the Event: by the event Name or by a set of event values. An event payload extraction module 112 extracts the event related payload from the event message, an event payload transformation module 114 transforms the event to a standard normalized form, and an event transmission module 115 forwards the communication of the event onward to downstream components.

Furthermore, system 100 includes a visualization platform 116 which is configured to provide various types of reports for users. In one embodiment, user reports are provided in a web format. For example, information is displayed as part of a dashboard containing KPIs 121, alerts 122, and/or notifications 123. Users may view reports in various ways, such as using a computer monitor, a mobile phones, a PDA, etc. The visualization platform 116 includes a search UI 117 that drives search activities and includes a design time UI 118 which helps business users in modeling, viewing, and modifying business processes to keep up with changing business requirements. Additionally, the situation manager application provides a single place to view, design/customize, deploy and manage sensors, events source, events, filters, processors, rules, responses and dashboards, processes (e.g., BPM) and services.

The visualization platform 116 includes a transactional UI 119 used to perform ERP/CRM/SCM/Other transactions, BI widgets 124 used for BI screens, and BAM widgets 125 used for BAM screens constructed using the data visualization toolkit.

System 100 further includes a deployment platform 126, which includes an S&R application created using the steps described above which can be deployed and un-deployed from within the situation manager. The deployment platform 126 includes deployment services 127 which reads the design time information and deploys SNR components to the SOA server. The deployment services 127 includes context management performs 128 configured to determine context for situation detection and loads, and manages the lifecycle of context data. The deployment services 127 may include transactional components 129 which are software components that perform transactional activities such as creating an order. The BAM server 130 provides real-time access to critical business performance indicators to improve the speed and effectiveness of business operations. The BAM is configured to process and analyze events in light of other business activities. The BI components 131 analyzes the events from the sense response server, and if needed, uses information from the event hub. In various embodiments, the BI components 131 provide both short-term and long-term analysis and decision. Furthermore, alerts 132 are used to bring situations of potential conflict to the notice of users, notifications 133 are used to notify situations of interest to the notice of users, and BI widgets 134 and BAM widgets 135 are similar to BI widgets 124 and BAM widgets 125.

Further, SOA event sensing, processing, and situation detection module 137 implements a method which includes detecting a first event. The method additionally includes receiving a first set of attributes associated with the first event, processing the first set of attributes, and additionally determining a first context information for the first event based at least on the first set of attributes. The method also includes storing the first context information, analyzing the first context information, selecting a logic element for interpreting the first context information, and checking a context inconsistency using the logic element. Further, the method includes resolving the context inconsistency if it is determined that the first contact information has the context inconsistency, determining dependencies between the first event and the set of related events using at least the first context information, generating a first set of responses based on the first set of attributes and the dependencies using a first set of rules and the first context information, and providing, at the user interface, the first set of response to the user.

The SOA event sensing, processing, and situation detection module 137 includes a CEP 138 which combines the real time information of the business activity monitoring (BAM) and business intelligence (BI) dashboards with the data of the stored in the event hub (e.g., a event repository), the users can discover new information, such as trends or long term changes. The sense & respond server provides this kind of intelligence based on pre-built rules 139 and machine learning. Furthermore, come custom code 140, such as Java/Script code is used for situation detection.

An event/situation response module 141 is in communication with The SOA event sensing, processing, and situation detection module 137. The event/situation response module 141 includes a BPM server 142, which is a part of the response module 141 and is event-driven. Business process management attempts to improve processes continuously, and it could therefore be described as a "process optimization process." Being event-drive, the event driven BPM is able to update various business processes in response to the events. The BAM server 143 provides real-time access to critical business performance indicators to improve the speed and effectiveness of business operations. The BAM server 143 is configured to process and analyze events in light of other business activities. The event/situation response module 141 further includes applications/services 144.

An in-memory processing platform 145 is in communication with the event sensing, processing, and situation detection module 137 and the event/situation response module 141. The in-memory processing platform 145 includes an intelligent context manager (SCA) 146 which, in event driven systems, provides a context mediator which has the following responsibilities: Provide a centralized model of context that all events in a given situation can share, Acquire contextual information from event sources, Reason about contextual information that cannot be directly acquired from the sensors, Detect and resolve inconsistent knowledge stored in the shared context model, and Protect privacy by enforcing policies that users have defined to control the sharing and use of their contextual information.

The in-memory processing platform 145 further includes an intelligent context initializer (SCA) 147, which initializes the context cache with data to help situation detection. The in-memory processing platform 145 also includes a distributed shared cache (such as Coherence) 148 and a distributed event and situation object model 149.

Additionally, system 100 includes an event analysis platform 150 in communication with the event transmission and normalization (ESB) 109 and a search platform 155. The event analysis platform 150 includes an event and situation repository 151, which stores events received. For example, the event hub includes a database for organizing and/or storing events. The event hub can later be access for performing business intelligence analysis. The event analysis platform 150 further includes data mining 152, ETL 153, and OBIA 154.

The search platform 155 is in communication with each or the platforms: visualization platform 116, deployment platform 126, event/situation response module 141, in-memory processing platform 145, and event analysis platform 150. The search platform 155 provides the ability to search on events and situations (in addition to other enterprise objects) and provide relevant results. The search platform 155 includes a search engine 156 which processes search queries, and an event information base 156, which is a repository of all events and situations that have been processed by the sense and response system 100.

Figure 2A:
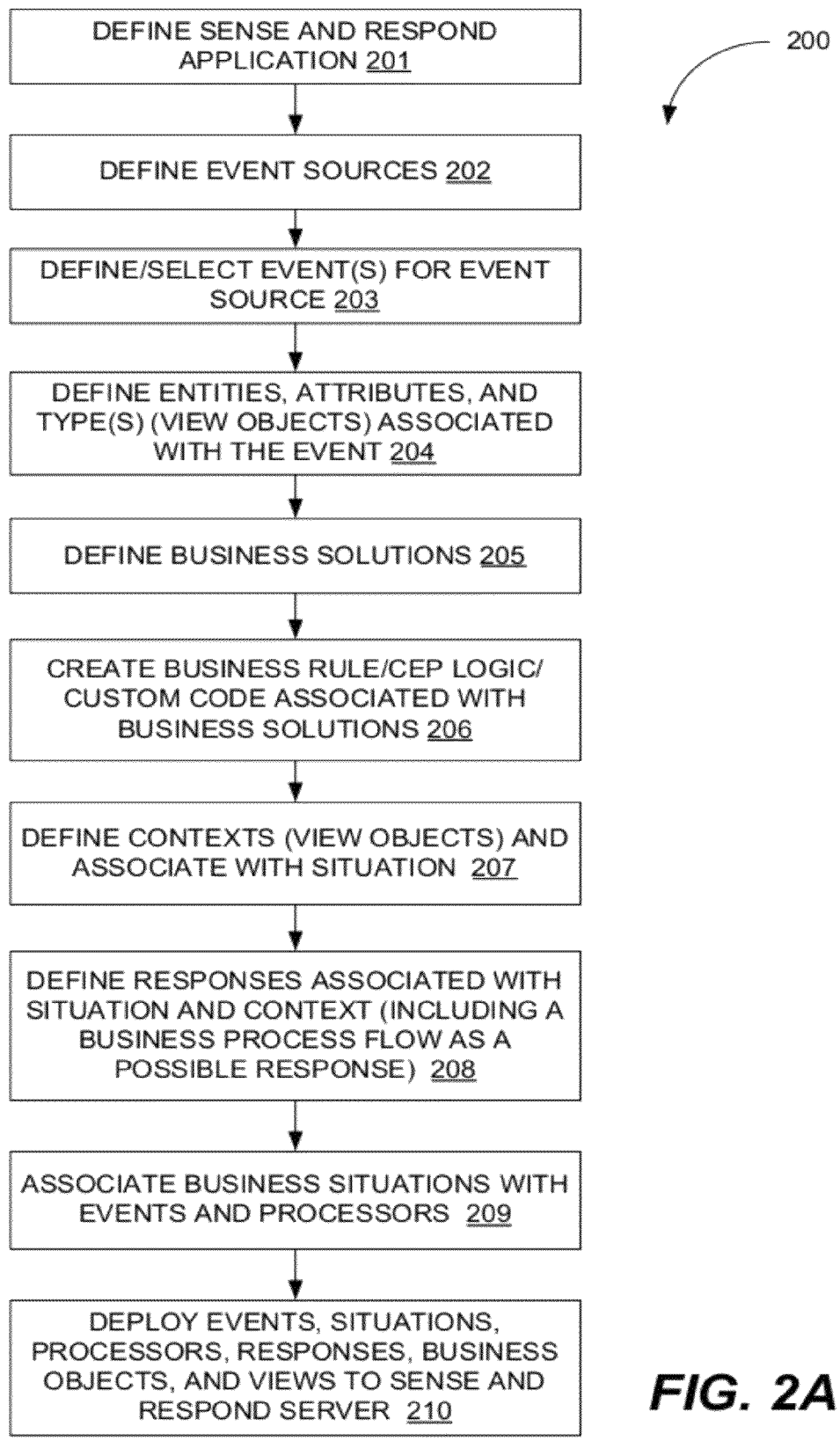
FIG. 2A is a simplified flow diagram illustrating a method 200 of providing design time implementations, according to an embodiment of the present invention.

Referring now to FIG. 2A, which illustrates a simplified flow diagram of a method 200 of providing design time implementations, according to an embodiment of the present invention. Method 200 implements a design and deploy time diagram. This diagram details the sequence and the component steps that a sense and respond designer may step through in order to design and deploy a sense and respond application. At process block 201, the sense and respond application may be defined. For example. the scope of the Sense and Respond Application (i.e., the entire set of artifacts that are associated with one deployment unit may be named). In one embodiment, situation design repository 101, design time ontology 102, and design UI 118 may be used to implement process block 201.

At process block 202, event sources may be defined. In one embodiment, the event sources are selected (or defined) that are the potential sources of the events for the application. In one embodiment, situation design repository 101, design time ontology 102, and design event sources 105 may be used to implement process block 202. Furthermore, at process block 203, the event(s) are defined/selected for the event source(s). The events that are available from the source are selected or defined. This may be implemented using the design time ontology 102 and the design event sources 105.

At process block 204, entities, attributes, and type(s) (view objects) associated with the event are defined. In one embodiment, the entities and the attributes of these entities contained in the events emanating from the event sources may be specified. The situation design repository 101, the design time ontology 102 and the design event sources 105 may be used to implement process block 204. At process block 205, business situations are defined. In one embodiment, using the design time ontology 102, business situations that are the result of conditions that apply on the event attributes are defined.

Further, at process block 206, business rules/CEP logic/custom code associated with business situations may be created. In one embodiment, using CEP 138, the processor that defines the conditions that the events are evaluated against is defined. At process block 207, contexts (e.g., view objects) associated with the situation may be defined. In one embodiment, using context ontology 104, the context that drive the identification of the actions that apply to the situation are identified. The contexts may be view objects and have backing entities and attributes.

At process block 208, responses associated with the situation and context (including a business process flow as a possible response) are defined. In one embodiment, using the situation design repository 101 and the design time ontology 102, the responses that are determined as a combination of the situation and the context are defined. At process block 209, the business situations are associated with events and processors. In one embodiment, using the situation design repository 101 and the design time ontology 102, the business situations are associated with the various events that are input. At process block 210, events, situations, processors, responses, business objects, and views are deployed to the sense and respond server. In one embodiment, using the deployment services module 127 and the event/situation response module 141, the entire set of artifacts are published as one deployment unit on to the sense and respond server.

Figure 2B:
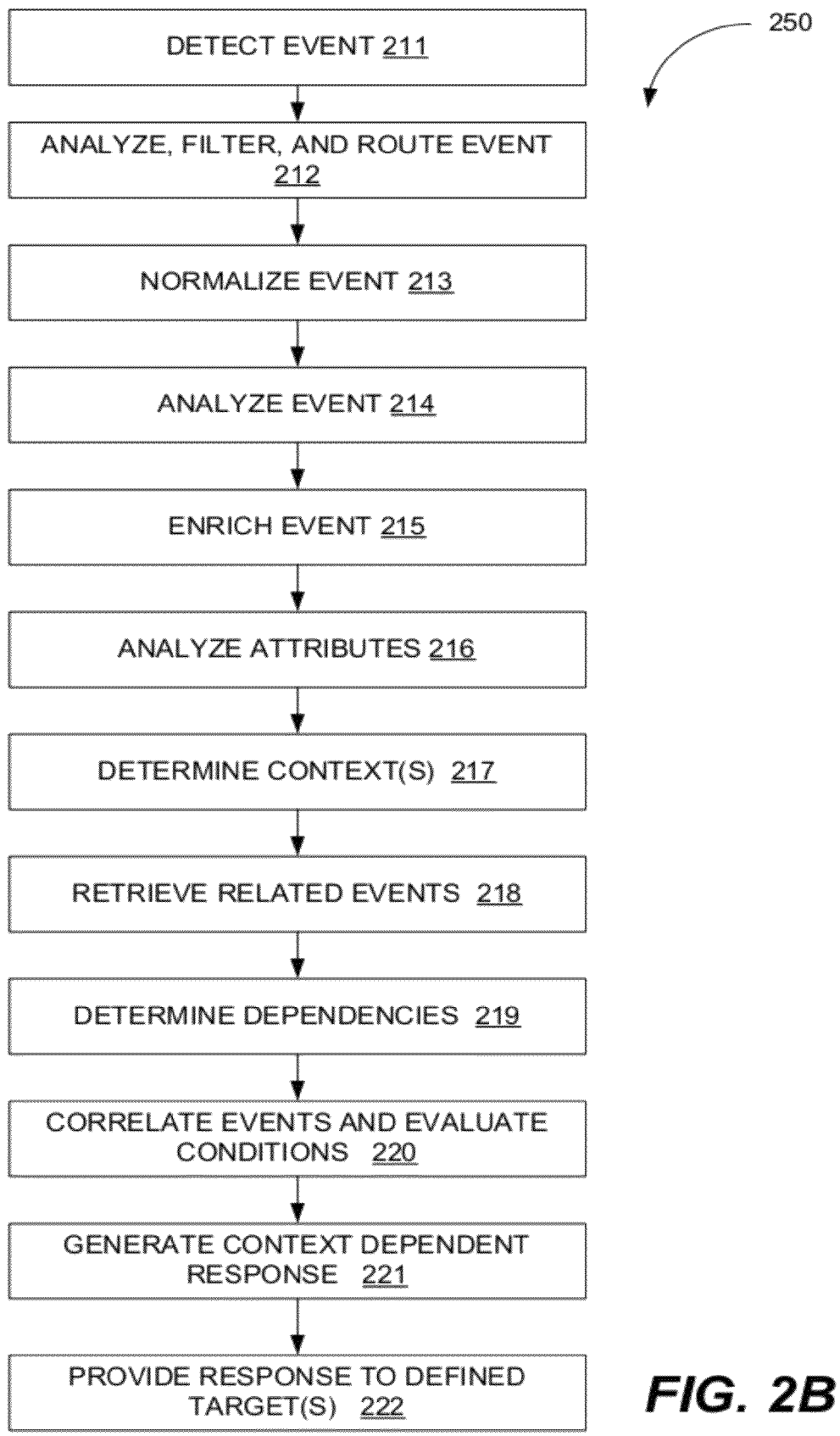
FIG. 2B is a simplified flow diagram illustrating a method 250 of providing run time implementations, according to an embodiment of the present invention.

Turning next to FIG. 2B, which illustrates is a simplified flow diagram of a method 250 of providing run time implementations, according to an embodiment of the present invention. At process block 211, using the event transmission and normalization (ESB) 109 and event logging 110, the sense and respond system 100 detects the arrival of an event from either an internal or an external source. At process block 212, using the event transmission and normalization (ESB) 109, including the event logging 110, event type recognition, filtering, and routing module 111, the event payload extraction module 113, the event payload transformation module 114, and the event transmission module 115 the sense and respond system 100 analyzes the event (e.g., looks up event type attribute) and determines if this event is of interest.

At process block 213, using the SOA event sensing, processing, and situation detection module 137, the event is normalized to a standard for a well defined schema. At process block 214, also using the SOA event sensing, processing, and situation detection module 137, the event attributes are analyzed for enrichment purposes, and at process block 215, the event attributes are enriched with information from enterprise systems. Furthermore, at process block 216, the event attributes are inspected for context determination purposes, and the context for the situation is determined (process block 217).

At process block 218, using the SOA event sensing, processing, and situation detection module 137 and the event analysis platform 150, the events related to the current state of the system and the situation under consideration are retrieved. Then, at process block 219, using the SOA event sensing, processing, and situation detection module 137, the intelligent context manager (SCA) 146, and the event and situation repository 151, the dependent objects needed for the determination of a situation are loaded. At process block 220, using the SOA event sensing, processing, and situation detection module 137, the CEP engine, for example, would use CQL queries to evaluate if the event set is intended for a situation of interest.

Furthermore, at process block 221, using the SOA event sensing, processing, and situation detection module 137, system 100 uses the loaded context to determine and issue a response, then using the event/situation response module 141, the response is transmitted to the target system (process block 222).

Figure 3:
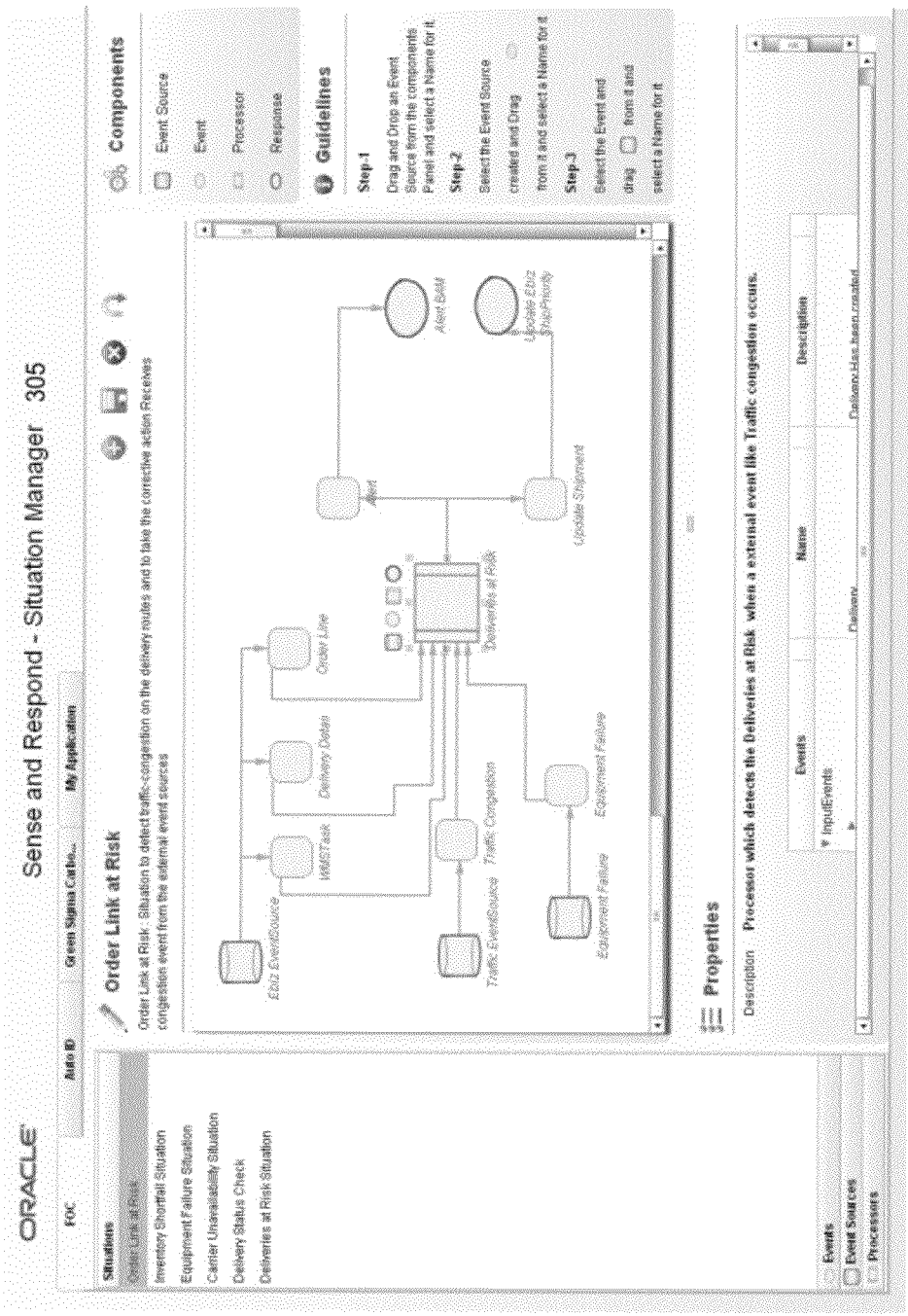
FIG. 3 is a simplified diagram illustrating a user interface for a situation manager application, according to an embodiment of the present invention.

FIG. 3 is a simplified diagram illustrating a user interface for a situation manager 305, application according to an embodiment of the present invention. This diagram is merely an example, which should not unduly limit the scope of the claims. One of ordinary skill in the art would recognize many variations, alternatives, and modifications. As an example, a series of processes that model the following business processes: monitoring traffic situation in order to report delays to incoming inventory. Shipment delay situation is common for many industries. For example, delivery time is important in case of farm and dairy products, where prolonged delays can cause damage to goods and lead to huge business losses.

As is evident from FIG. 3, the model represents a business process that abstracts away technical details (e.g., computer programming implementations) that are inherent to each of the processes and focuses only on business entities such as events, event sources, processors, and situations. Using the situation manager 305, business users can model a process by dragging and dropping components from a component palette consisting of events, event sources, processors and responses. They can connect these processes and define a business flow that will regulate the flow of events through the system.

According to various embodiments, a situation manger allows users to create and manage sense and response applications and their individual components. The situation manager 305 includes, among other components, events, event source, situation, response, and sense and response application.

As an example, events are represented as "xsd". The events can be classified into two types: (1) entities; and (2) actions that belong to each of these entities. One example is Order Header Entity and Order booking event. A create-read-update-delete (CRUD) event would be represented by the entity. Other events would be modeled as actions. The :xsd" representation can be created by using a suitable editor and uploaded into the situation manager 305.

Event source is a generator module for specified events. Among other thing, the event source could encapsulate a wide variety of real world sources (e.g., Data Base Tables, RSS Feeds, Web Service Calls). For example, an event source can be seen as an adapter which pumps the events into the Sense and Respond Framework. An event source can feed many event types. For example, one event can be fed by multiple event sources. A pluggable adapter capable of pumping in events can be referred to as a type of an event source. Event sources may be created in various ways: service-oriented architecture (SOA) composite; plain old java object (POJO), and others.

A situation component can be seen as a black box of deployable codes. In various embodiments, the situation component takes event streams as input and tells if a situation has occurred or not as events are fed into it. The business logic for the situation is encapsulated inside the situation black box. Depending on the application a situation component may be implemented in various ways: (1) complex event processing (CEP) Event Processing Network; (2) business rules; (3) business process execution language (BPEL); (4) workflow with human intervention; and (5) others.

In one embodiment, situations are defined using an integrated design environment (IDE) most suited for the implementation you are planning The situation thus defined can be imported into the Situation manager 305.

Response is the action that has to be performed when a situation is detected. Among other things, a response is a deployable block which is capable of invoking external actions. This translates to adapters which are able to invoke PL/SQL, call web services, write to files, and perform other actions. A response can be created using SOA composite, POJO, and others.

For example, responses are defined using the IDE that best suites the job and can be imported into Situation manager 305. One situation can have multiple responses, many situations can use the same compatible response.

An S&R application can be built by connecting event sources to a chain of situations and finally to responses. For example, a user interface is shown in FIG. 3 for connecting events and responses. In a specific embodiment, the following steps are performed for creating an S&R application:

i) Select situation.
ii) Once a situation is selected, it would have prerequisites in terms of events. Select one or more event sources for each of the event that is required.
iii) The output events of a situation can be sent to other situation or multiple responses.
iv) The S&R network starts with one or more event sources and end with one or more responses.

The S&R application created using the steps described above can be deployed and undeployed from within the Situation manager 305.

In certain embodiments, the situation manager 305 acts as a repository for various components, as each the components imported can be used (and shared) by many S&R applications. For example, there are multiple interfacing methods that can be used for connecting the different components together.

In one embodiments, the present invention provides a three-phase method for creating sense and respond application: (1) define; (2) connect, and (3) deploy.

At the define phase, necessary components (e.g., events, event sources, situation, responses) that are required for the application are defined in the Situation manager 305.

Figure 4:
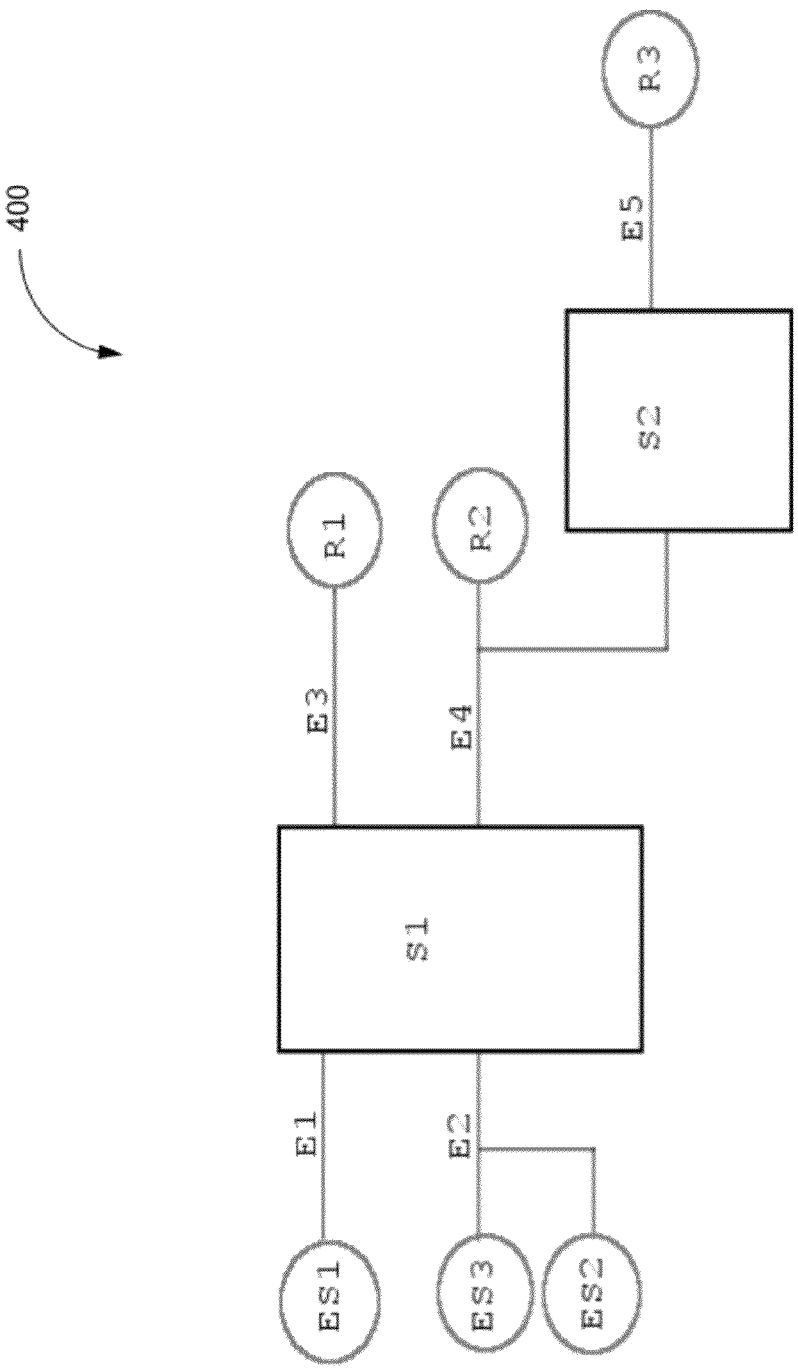
FIG. 4 is a simplified diagram illustrating a process for connecting components for a sense and response application, according to an embodiment of the present invention.

Connect phase is provided in which the application is build by connecting together the different components. For example, the result is an application xml (AXML) file which describes the components of the application and their relation. FIG. 4 is a simplified diagram illustrating a process for connecting components for a sense and response application according to an embodiment of the present invention. This diagram is merely an example, which should not unduly limit the scope of the claims. One of ordinary skill in the art would recognize many variations, alternatives, and modifications.

In FIG. 4, there are four types of components: (1) events, (2) event sources; (3) situations; and (4) responses. These components are listed blow:

Events: E1, E2, E3, E4, E5

Event Sources: ES1, ES2, ES3

Situations: S1, S2

Response: R1, R2, R3

In light of the relationship among components as illustrated in FIG. 4, an AXML file is created for the sense and respond application, its source code is shown below:

```xml
<Application name="Sample">
    <EventSource id="ES1">
        <Sinks Event="E1">
            <Sink name="S1" />
        </Sinks>
    </EventSource>
    <EventSource id="ES3">
        <Sinks Event="E2">
            <Sink name="S1" />
        </Sinks>
    </EventSource>
    <EventSource id="ES2">
        <Sinks Event="E2">
            <Sink name="S1" />
        </Sinks>
    </EventSource>
    <Situation id="S1">
        <Sinks Event="E3">
            <Sink name="R1" />
        </Sinks>
        <Sinks Event="E4">
            <Sink name="R2" />
            <Sink name="S2" />
        </Sinks>
    </Situation>
    <Response id="R1" />
    <Response id="R2" />
    <Situation id="S2">
        <Sinks Event="E5">
            <Sink name="R3" />
        </Sinks>
    </Situation>
    <Response id="R3" />
</Application>
```

At deploy phase, a sense and response server takes up the AXML file and deploys the respective servers for which the components were designed. The AXML and a Queue Lookup for all the components is sent to the Message Switch Board (MSB). For example, MSB is a lightweight ESB, which is responsible for routing the messages between the different components In the past, a complex IT infrastructure is many times the panacea for a complex business problem. Often, the complexity of the solution soon turns into a nightmare because of the high cost of maintenance and dependence of business analysts, who have limited access to the underlying technology, on IT staff, which has limited understanding of the business. When the business process changes, business analysts have to log change requests with their IT team and explain the changes needed, which leads to elaborate change request procedures. When designing the sense and respond solution, this was identified as a key problem area. It could cause delay in modeling and modifying business processes. Also, it would require a dependable IT team, either to be recruited or contracted each time the system needed configuration. It is therefore to be appreciated that the situation manager 305 application according to the present invention provided an interface that is simple to use and easy to manage. More specifically, situation manager 305 provides a single, unique platform for managing business processes. For example, business Process can be streamlined by performing strategic analysis on historical reports as obtained from an event hub. With a graphical interface, business processes can be deployed or undeployed on click of a button. Essentially, the situation manager 305 helps match the dynamic nature of business, new business policies and/or rules can be integrated into the system easily and quickly without much of technical support from the system administrator end.

It is to be appreciated that the customization of sense and response system according to embodiments of the present invention is not limited in situation manager 305. In various embodiments, a context manager 128 architecture is provided to allow users to define the context under which events are analyzed. A detailed description is provided below.

Among other things, context manager 128 is provided to allow users to fine tune a sense and response system to accommodate various irregularities. Often, small delays and irregularities can have severe repercussions for a business in its downstream processes. For example, a delay in acquiring raw materials from a supplier can cause stock-out at the retailer's outlet. This delay could be in transportation or logistics. In either case, the person in-charge needs to monitor every inflection point in the supply chain, identify alarming situations and respond to the situation based on company policies or in many cases his/her better judgment. Without an automated sense and response system of the present invention, the person in charge often have to manually make adjustments. In this example, as soon as the person in-charge realizes the delay, she must select an alternative supplier who can fulfill the order in time. Delay in realizing the situation or in taking appropriate action could result in a stock-out. Since the sense and respond process is manual, the business is subject to high risk of failure.

As explained above, a sense and respond system according the present invention can be coarsely divided into 3 tiers (1) event source tier, (2) processing tier, and (3) presentation tier.

The event source tier is at the edge of the system and interfaces with third party devices such as temperature, pressure sensors, RFID readers, location detecting devices etc. Incoming events are filtered and relayed to the processing tier, which consists of the Sense and respond server. The Sense and respond server consumes events and runs them through a composite assembly of processes. Each process enhances the device level event with business context and helps in the interpretation of the event based on pre-seeded business rules and machine learning algorithms. The outcome of these processes is a real-world business situation. This is sent to the presentation tier, where a business user can view and take action in response to the business situation.

Figure 5:
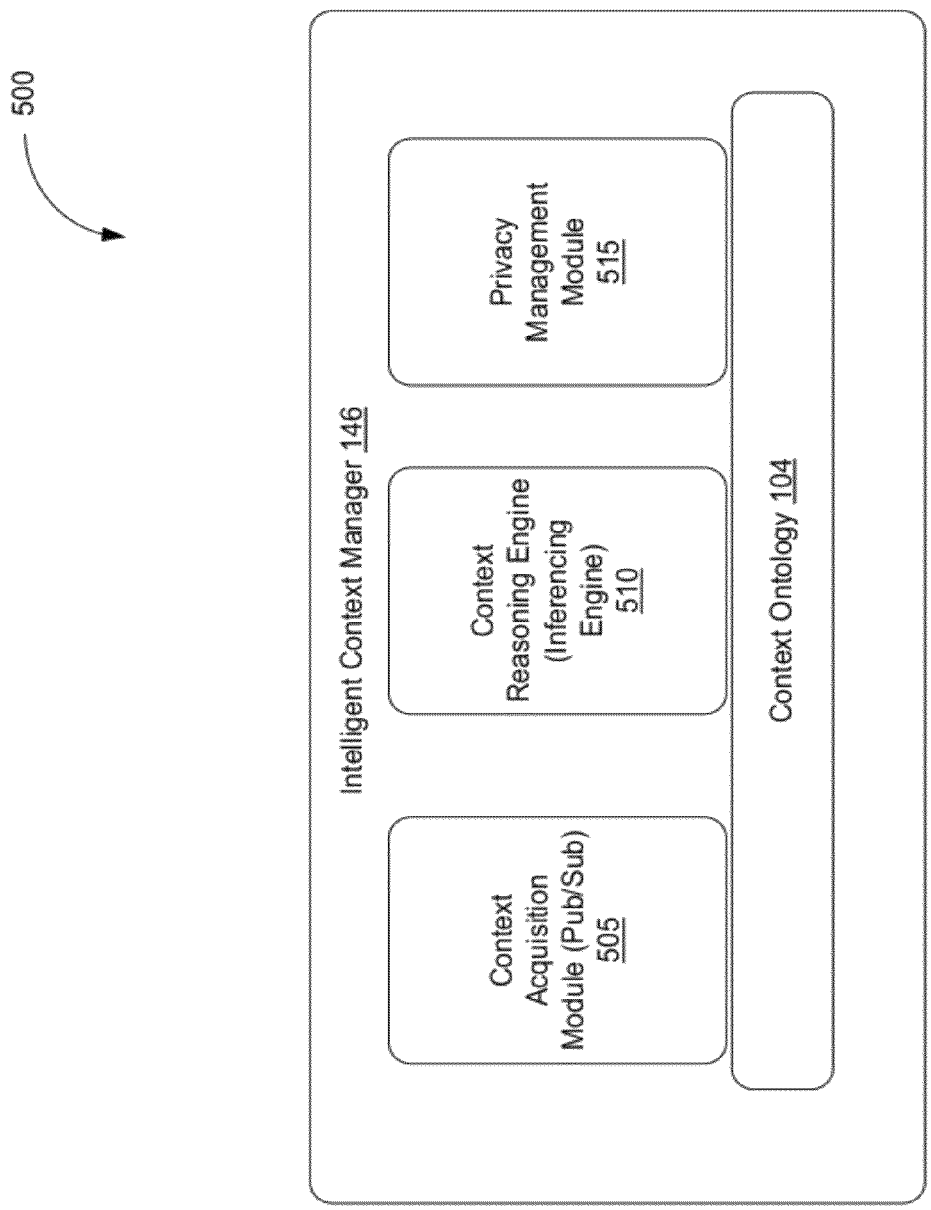
FIG. 5 is a simplified block diagram illustrating an intelligent context manager, according to an embodiment of the present invention.

In various embodiment, an Intelligent Context Manager Architecture (ICMA), which is a service-centric architecture for supporting contextualization of such event driven systems, is used to process events in their proper context. Central to the ICMA is an intelligent service called context mediator illustrated in FIG. 5. FIG. 5 is a simplified block diagram illustrating a context mediator according to an embodiment of the present invention. This diagram is merely an example, which should not unduly limit the scope of the claims. One of ordinary skill in the art would recognize many variations, alternatives, and modifications. A context manager 128 shown in FIG. 5 is a specialized server entity that runs on a resource-rich compute space.

In event driven systems, a context manager 128 provides the following functions:
Provide a centralized model of context that all events in a given situation can share,
Acquire contextual information from event sources (505),
Reason about contextual information that cannot be directly acquired from the sensors (510),
Detect and resolve inconsistent knowledge stored in the shared context model, and
Protect privacy by enforcing policies that users have defined to control the sharing and use of their contextual information (515).

In one embodiment, a functional design of the context mediator comprises four modular components. Each component provides distinctive functions for supporting (1) persistent data storage; (2) context reasoning; (3) context acquisition; and (4) privacy protection. As illustrated in FIG. 5, the context manager 128 acquires context information from event sources in its environment and fuses it into a coherent model, which is then shared with the event processing/situation detection engine to aid the process of contextual situation detection and alerting process.

Context knowledge base is configured to manage the storage of the context mediator's knowledge. This knowledge includes the ontology for describing various types of contexts as well as the ontology instance data (520).

Context-reasoning engine is a logical inference engine for reasoning over the acquired contextual information. For example, the function of this engine includes interpreting context based on the acquired event data, aggregating the contextual information from multiple sources using ontology and domain heuristics, detecting and resolving inconsistent information.

Context-acquisition module is a set of services for acquiring contextual information from various sources to enable contextual situation detection. It hides the low-level context acquisition implementations from the high-level functional components. This middle-ware based design is aimed to improve the reusability of the context sensing procedures.

Privacy-management module manages the users' privacy policies and controls the sharing of their private context information. It is responsible for enforcing the appropriate privacy policies when the context mediator attempts to share contextual information for situation detection. When sharing information, if it is forbidden by some user's policy, this component also helps to guide the logical reasoning to adjust information granularity.

Depending on the application, context module includes other components as well, such as context reasoning and web ontology language (OWL) component. For example, the function of a context-aware system depends on the support of context reasoning. Context reasoning in the ICMA is implemented via with a rule-based logical inference approach using OWL-DL.

Figure 6:
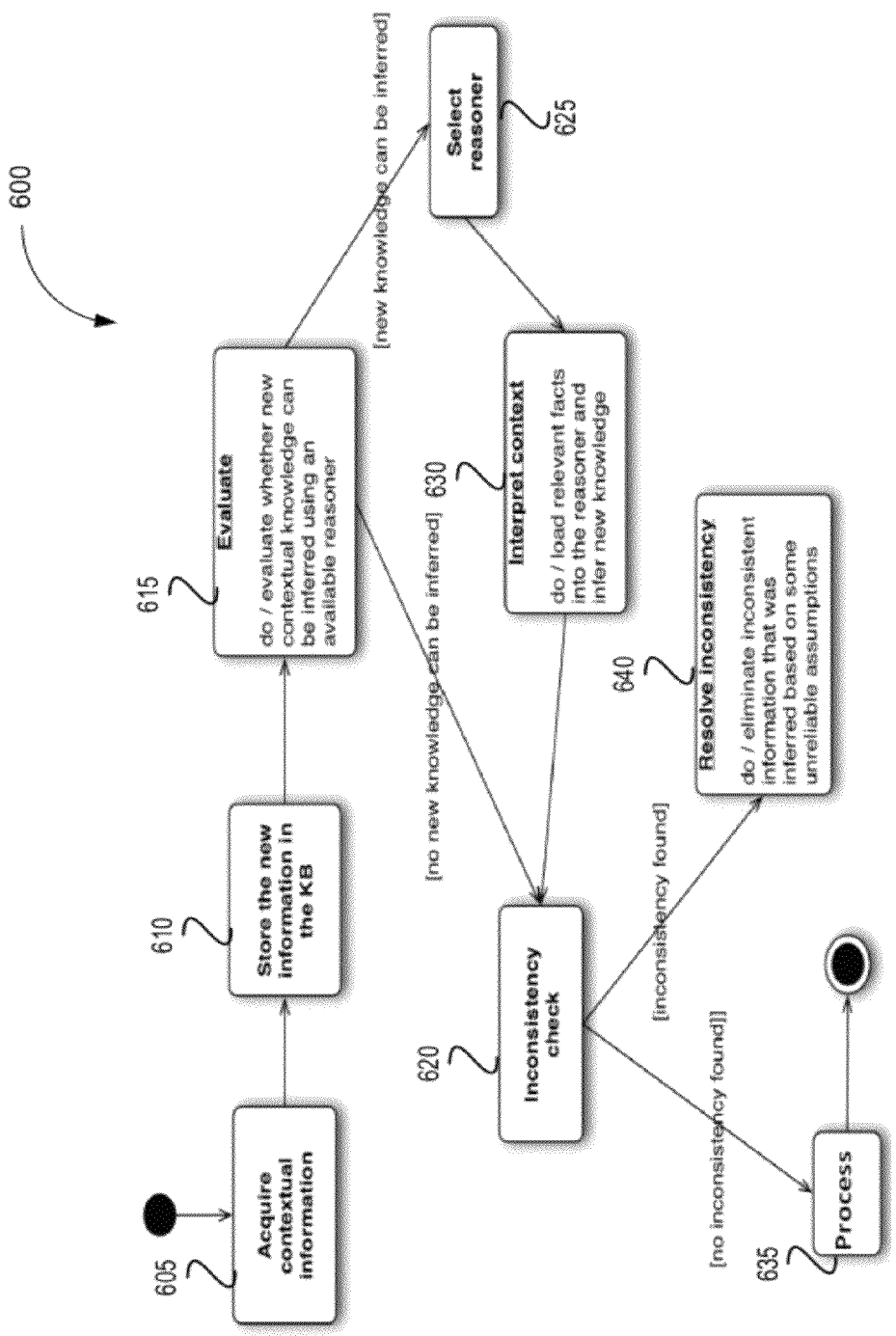
FIG. 6 is a simplified flow diagram illustrating operation of the intelligent context manager, according to an embodiment of the present invention.

Various components the context manager 128 are implemented to work with one another. FIG. 6 is a simplified diagram illustrating operation of a context manager 128 according to an embodiment of the present invention. This diagram is merely an example, which should not unduly limit the scope of the claims. One of ordinary skill in the art would recognize many variations, alternatives, and modifications.

As shown in FIG. 6, context information is first acquired in light of one or more events (process block 605). The new information is stored in the knowledge database (process block 610). An evaluation is performed do determine whether new context knowledge can be inferred using an available reasoner (decision block 615). If new knowledge can be inferred, a reasoner is selected (process block 625), and context is interpreted by the reasoner (process block 630). If new knowledge cannot be inferred, then consistence is checked (decision block 620). If the context is consistent, then the context is processed (process block 6635). If the context is inconsistent, inconsistency is resolved and/or eliminated (process block 640).

The use of context manager 128 provides many benefits. Among other things, an explicit representation of the context reasoning rules provided by the context manager 128 can help separate the high-level reasoning logic from the low-level functional implementation. Additionally, by separating the logic from the functional implementation, developers can modify or replace context-reasoning components without requiring significant amount of re-programming efforts. A rule-based approach according to the present invention allows many well-defined logic models of general concepts such as time and space to be directly mapped into the context reasoning implementation. The logical inferences associated with these general concepts are often useful in context reasoning. When context interpretation rules are explicitly represented, meta-reasoning techniques can be developed to detect and resolve inconsistent context interpretations. There are other benefits as well.

Figure 7:
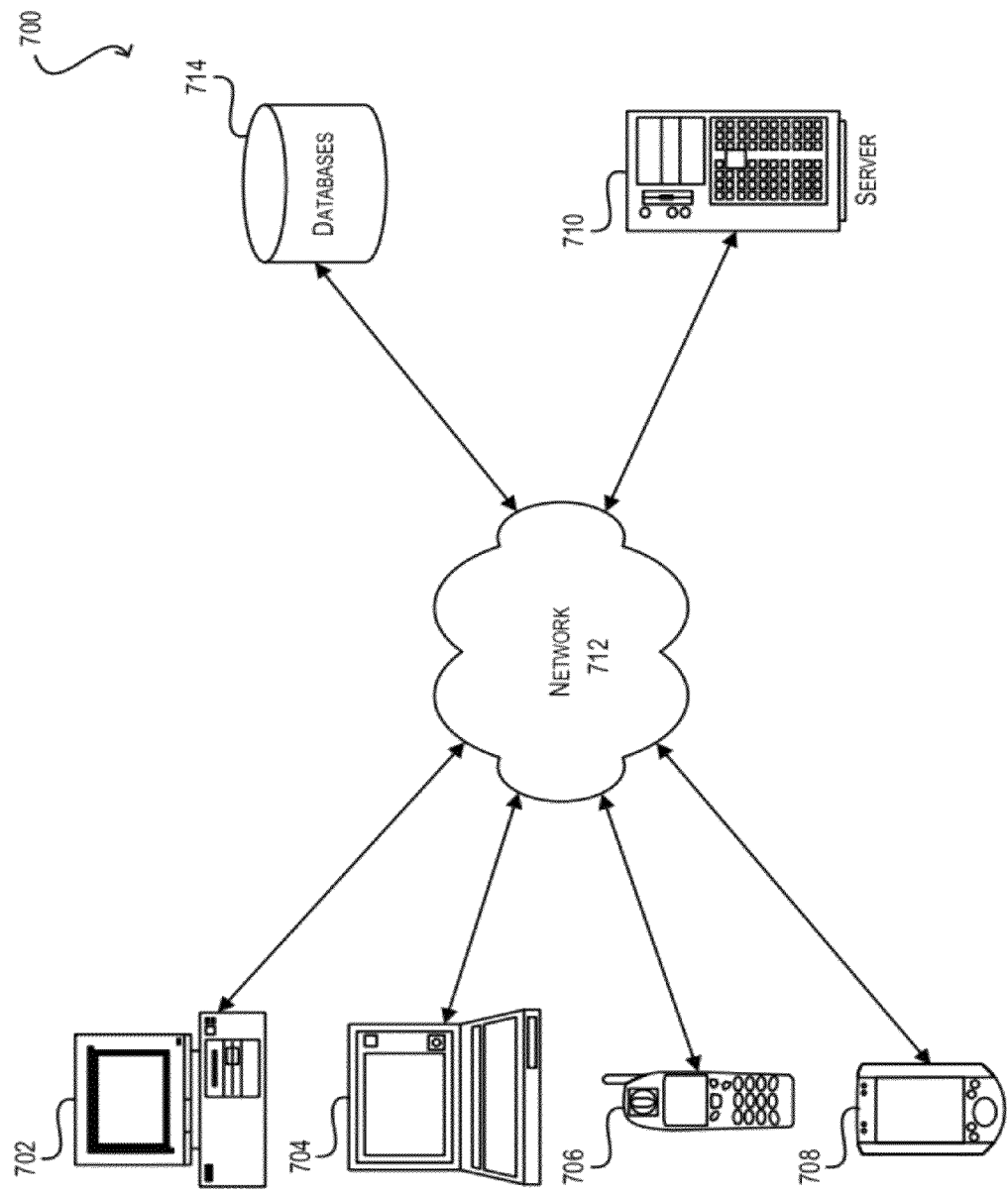
FIG. 7 is a simplified block diagram illustrating physical components of a system environment 700 that may be used in accordance with an embodiment of the present invention.

FIG. 7 is a simplified block diagram illustrating physical components of a system environment 700 that may be used in accordance with an embodiment of the present invention. This diagram is merely an example, which should not unduly limit the scope of the claims. One of ordinary skill in the art would recognize many variations, alternatives, and modifications.

As shown, system environment 700 includes one or more client computing devices 702, 704, 706, 708 communicatively coupled with a server computer 710 via a network 712. In one set of embodiments, client computing devices 702, 704, 706, 708 may be configured to run one or more components of a graphical user interface described above. For example, client computing devices allow user to view sense and response report, create sense and response application, and modify rules and context.

Client computing devices 702, 704, 706, 708 may be general purpose personal computers (including, for example, personal computers and/or laptop computers running various versions of Microsoft Windows™ and/or Apple Macintosh™ operating systems), cell phones or PDAs (running software such as Microsoft Windows™ Mobile and being Internet, e-mail, SMS, Blackberry,™ and/or other communication protocol enabled), and/or workstation computers running any of a variety of commercially-available UNIX™ or UNIX™-like operating systems (including without limitation the variety of GNU/Linux™ operating systems). Alternatively, client computing devices 702, 704, 706, and 708 may be any other electronic device capable of communicating over a network (e.g., network 712 described below) with server computer 710. Although system environment 700 is shown with four client computing devices and one server computer, any number of client computing devices and server computers may be supported.

Server computer 710 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any of a variety of server applications and/or mid-tier applications, including web servers, Java virtual machines, application servers, database servers, and the like. In various embodiments, server computer 710 is adapted to run one or more Web services or software applications described in the foregoing disclosure. For example, server computer 710 is specifically configured to process events and provide decision based on sense and response method.

As shown, client computing devices 702, 704, 706, 708 and server computer 710 are communicatively coupled via network 712. Network 712 may be any type of network that can support data communications using any of a variety of commercially-available protocols, including without limitation TCP/IP, SNA, IPX, AppleTalk™, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol known in the art, and/or any other wireless protocol); and/or any combination of these and/or other networks. In various embodiments, the client computing devices 702, 704, 706, 708 and server computer 710 are able to access the database 714 through the network 712. In certain embodiments, the client computing devices 702, 704, 706, 708 and server computer 710 each has its own database.

System environment 700 may also include one or more databases 714. Database 714 may correspond to an instance of integration repository as well as any other type of database or data storage component described in this disclosure. Database 714 may reside in a variety of locations. By way of example, database 714 may reside on a storage medium local to (and/or resident in) one or more of the computing devices 702, 704, 706, 708, or server computer 710. Alternatively, database 714 may be remote from any or all of the computing devices 702, 704, 706, 708, or server computer 710 and/or in communication (e.g., via network 712) with one or more of these. In one set of embodiments, database 714 may reside in a storage-area network (SAN) familiar to those skilled in the art. Similarly, any necessary files for performing the functions attributed to the computing devices 702, 704, 706, 708, or server computer 710 may be stored locally on the respective computer and/or remotely on database 714, as appropriate. For example the database 714 stores event information and rules associated with different situations and contexts.

Figure 8:
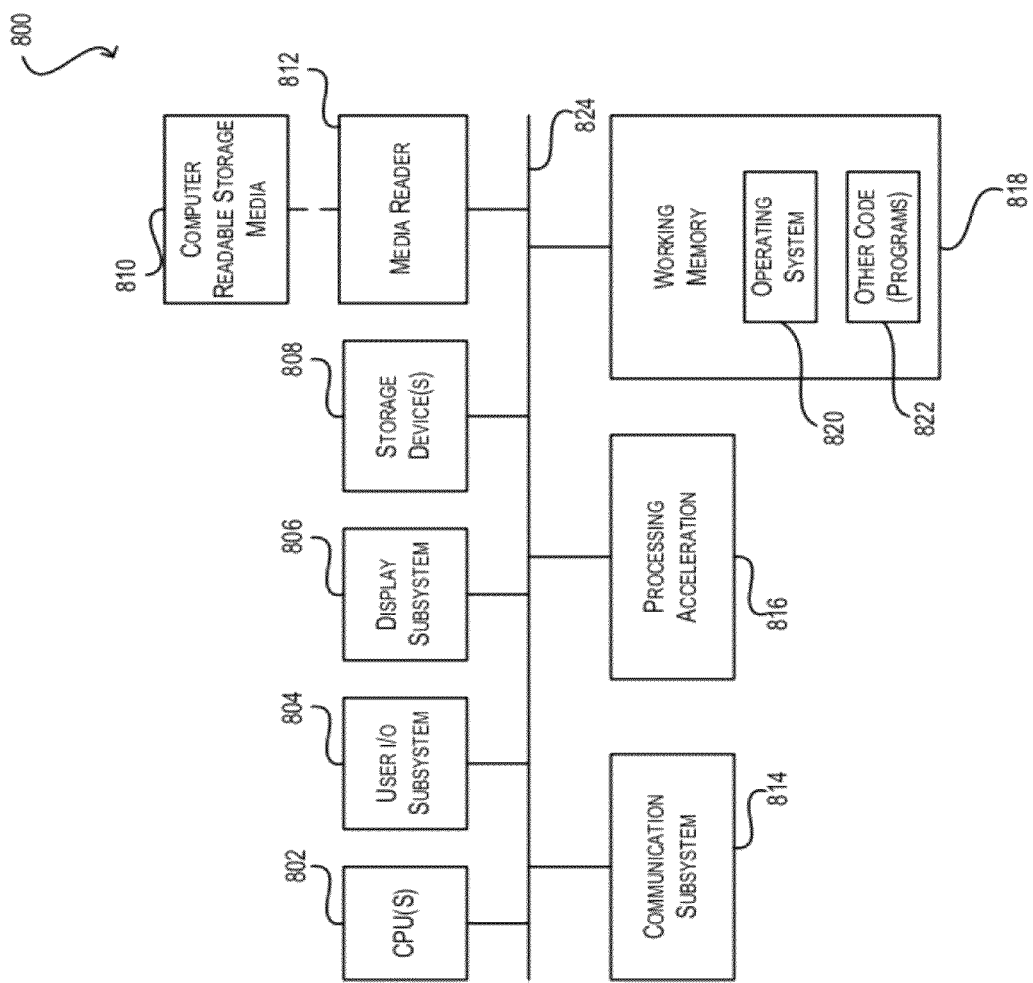
FIG. 8 is a simplified block diagram illustrating the physical components of a computer system 800 that may be used in accordance with an embodiment of the present invention.

FIG. 8 is a simplified block diagram illustrating the physical components of a computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of the computing devices 702, 704, 706, 708, or server computer 710 illustrated in system environment 700 described above. As shown in FIG. 8, computer system 800 comprises hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). For example, the input devices 804 are used to receive user inputs for creating a sense and response application illustrated in FIGS. 3 and 4. Computer system 800 may also include one or more storage devices 808. By way of example, storage devices 808 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 808. For example, the central processing units 802 is configured to retrieve data from a database and process the data for displaying on a GUI.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage devices 808) comprehensively representing remote, local, fixed, and/or removable storage devices plus storage media for temporarily and/or more permanently containing computer-readable information. Communications system 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable code and associated data structures for one or more of the design-time or runtime components/services illustrated in FIGS. 2 and 4. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 800.

In one set of embodiments, the techniques described herein may be implemented as program code executable by a computer system (such as a computer system 800) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer system, comprising:
one or more processors; and
a storage memory in communication with the one or more processors, the storage memory storing an enterprise application for providing automated decision in response to one or more events occurring within an enterprise supply chain application, wherein the enterprise supply chain application, when executed by the processors, causes the processors to perform procurement operations comprising:
  detecting, by a sense and response application, a first event within the enterprise supply chain application;
  receiving, by the sense and response application, a first set of attributes associated with the first event;
  analyzing the first set of attributes using at least pattern recognition;
  determining, by the sense and response application, a first context information for the first event based at least on the first set of attributes;
  analyzing the first context information;
  interpreting the first context using a logic element, wherein interpreting the first context comprises inferring new knowledge related to the first context;
  checking the new knowledge for a context inconsistency using the logic element;
  resolving the context inconsistency if it is determined that the new knowledge and the first context information has the context inconsistency;
  determining dependencies between the first event and the set of related events using at least the first context information; and
  generating, by the sense and response application, a plurality of responses, the plurality of responses comprising at least one short-term response based on the first set of attributes and at least one long-term response based on the dependencies using the set of rules and the first context information.

2. The system of claim 1, wherein detecting the first event comprises receiving notification of the first event from one or more of the following: an enterprise resource planning application, a news feed, sensor based events, events from external ecommerce systems.

3. The system of claim 1, wherein detecting the first event comprises receiving information about the first event from a sensor.

4. The system of claim 1, wherein detecting the first event comprises receiving notification of the first event from an external ecommerce system.

5. A method for providing automated decision in response to one or more events occurring within an enterprise supply chain application, the method comprising:
  detecting, by a sense and response application, a first event within the enterprise supply chain application;
  receiving, by the sense and response application, a first set of attributes associated with the first event;
  analyzing the first set of attributes using at least pattern recognition;
  determining, by the sense and response application, a first context information for the first event based at least on the first set of attributes;
  analyzing the first context information;
  interpreting the first context using a logic element, wherein interpreting the first context comprises inferring new knowledge related to the first context;
  checking the new knowledge for a context inconsistency using the logic element;
  resolving the context inconsistency if it is determined that the new knowledge and the first context information has the context inconsistency;
  determining dependencies between the first event and the set of related events using at least the first context information; and
  generating, by the sense and response application, a plurality of responses, the plurality of responses comprising at least one short-term response based on the first set of attributes and at least one long-term response based on the dependencies using the set of rules and the first context information.

6. The method of claim 5, wherein detecting the first event comprises receiving notification of the first event from one or more of the following: an enterprise resource planning application, a news feed, sensor based events, events from external ecommerce systems.

7. The method of claim 5, wherein detecting the first event comprises receiving information about the first event from a sensor.

8. The method of claim 5, wherein detecting the first event comprises receiving notification of the first event from an external ecommerce system.

9. A computer-readable memory device comprising a set of instructions stored therein which, when executed by a processor, cause the processor to provide automated decision in response to one or more events occurring within an enterprise supply chain application by:
  detecting, by a sense and response application, a first event within the enterprise supply chain application;
  receiving, by the sense and response application, a first set of attributes associated with the first event;
  analyzing the first set of attributes using at least pattern recognition;
  determining, by the sense and response application, a first context information for the first event based at least on the first set of attributes;
  analyzing the first context information;
  interpreting the first context using a logic element, wherein interpreting the first context comprises inferring new knowledge related to the first context;
  checking the new knowledge for a context inconsistency using the logic element;
  resolving the context inconsistency if it is determined that the new knowledge and the first context information has the context inconsistency;
  determining dependencies between the first event and the set of related events using at least the first context information; and
  generating, by the sense and response application, a plurality of responses, the plurality of responses comprising at least one short-term response based on the first set of attributes and at least one long-term response based on the dependencies using the set of rules and the first context information.

10. The A computer-readable memory device of claim 9, wherein detecting the first event comprises receiving notification of the first event from one or more of the following: an enterprise resource planning application, a news feed, sensor based events, events from external ecommerce systems.

11. The A computer-readable memory device of claim 9, wherein detecting the first event comprises receiving information about the first event from a sensor.

12. The A computer-readable memory device of claim 9, wherein detecting the first event comprises receiving notification of the first event from an external ecommerce system.

* * * * *

UNITED STATES PATENT AND TRADEMARK OFFICE
CERTIFICATE OF CORRECTION

PATENT NO. : 8,719,207 B2
APPLICATION NO. : 12/844632
DATED : May 6, 2014
INVENTOR(S) : Ratnam et al.

It is certified that error appears in the above-identified patent and that said Letters Patent is hereby corrected as shown below:

On the Title Page, Item (75), under inventors, line 9, delete "Bennet," and insert -- Bennett, --, therefor.

On Title Page 2, column 2, Item (56) under Other Publications, line 29, delete "Apr. 26." and insert -- Apr. 26, --, therefor.

In the Drawings

On sheet 1 of 9, in figure 1, under reference numeral 129, line 3, delete "Componets" and insert -- Components --, therefor.

In the Specification

In column 1, line 14, delete "12/793,37," and insert -- 128/793,375, --, therefor.

In column 7, line 45, delete "example." and insert -- example, --, therefor.

In column 10, line 59, delete "blow:" and insert -- below: --, therefor.

In column 11, line 38, delete "components" and insert -- components. --, therefor.

In column 14, line 32, delete "Blackberry,™" and insert -- Blackberry™, --, therefor.

Signed and Sealed this
Fourteenth Day of October, 2014

Michelle K. Lee
*Deputy Director of the United States Patent and Trademark Office*